UNITED STATES PATENT OFFICE.

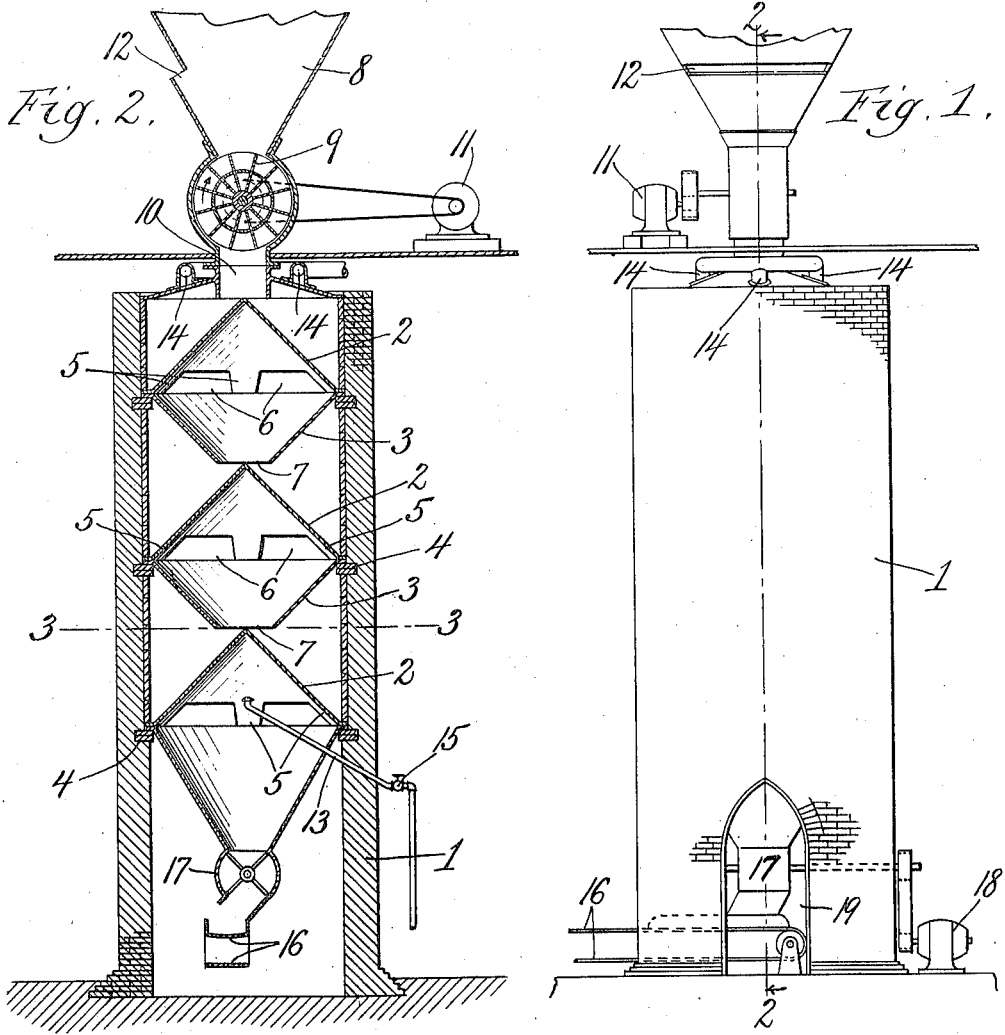
G. H. TOMLINSON.
APPARATUS FOR TREATING COMMINUTED LIGNO CELLULOSE.
APPLICATION FILED MAR. 10, 1911.
1,032,446. Patented July 16, 1912.

GEORGE H. TOMLINSON, OF CHICAGO, ILLINOIS, ASSIGNOR TO STANDARD ALCOHOL COMPANY, OF NEW YORK, N. Y., A CORPORATION OF MAINE.

APPARATUS FOR TREATING COMMINUTED LIGNOCELLULOSE.

1,032,446. Specification of Letters Patent. Patented July 16, 1912.

Application filed March 10, 1911. Serial No. 613,501.

*To all whom it may concern:*

Be it known that I, GEORGE H. TOMLINSON, a subject of the King of England, residing at Chicago, in the county of Cook and State of Illinois, have invented a certain new and useful Improvement in Apparatus for Treating Comminuted Lignocellulose, of which the following is a specification.

This invention relates to apparatus for treating comminuted ligno cellulose and has for its object to provide a new and improved apparatus of this description.

Referring to the accompanying drawings, wherein there is shown one form of apparatus for carrying out this invention; Figure 1 is a side elevation of a particular construction for this purpose; Fig. 2 is a sectional view taken on line 2—2 of Fig 1; Fig. 3 is a sectional view taken on line 3—3 of Fig. 2; Fig. 4 is a view showing a modified construction.

Like numerals refer to like parts throughout the several figures.

One of the objects of this invention is to provide an apparatus for properly acidulating comminuted ligno cellulose, such for example as sawdust, for the purpose of utilizing it in producing fermentable sugar, as set out, for example, in United States Letters Patent No. 938,308, granted October 26, 1909, to Ewen and Tomlinson.

When it is desired to mix a small amount of acid such as sulfuric acid with a large amount of sawdust, it has been found exceedingly difficult to secure a proper mixture and so to spread the acid as to bring some of it in contact with each particle of sawdust. If it is attempted to mix a small amount of acid with a large amount of sawdust in the ordinary digester in which the sawdust is treated, the mixture is liable not to be uniform, some portions of the sawdust receiving an excessive amount of acid while other portions of the sawdust receive very little or none. By means of the present apparatus a small amount of acid may be so thoroughly mixed with a large amount of sawdust as to secure a substantially uniform mixture.

According to the present invention the sawdust is provided in a moist condition and is then brought into contact with a hydrolyzing gas, usually an acidulating gas or vapor in such a way that this acidulating gas or vapor comes in contact with the various particles of sawdust in a substantially uniform manner. If, for example, this acidulating gas is sulfuric anhydrid ($SO_3$), it unites with the water in the sawdust forming sulfuric acid ($H_2SO_4$), thus producing a uniform acidulation. As herein shown there is provided an apparatus for spreading the sawdust into thin sheets or streams, and then bringing the acidulating gas or vapor into contact with the sawdust when thus spread out.

Referring now to the drawings, there is illustrated an absorbing chamber 1, which may be made of any suitable material such as brick, and which is provided with an acid-proof lining. Located within this chamber are a series of superposed, spaced, spreading devices 2, 2, conical in form, and apertured at their bases, as indicated at 6, leaving supporting legs 5 adapted to engage proper supports 4 carried by the chamber walls. Beneath each spreading device 2, and likewise carried by the support 4, is a hopper 3, having an open bottom 7, which hopper serves to collect the material falling through the apertures 6 and to deliver it at the apex of the spreading device 2 next below. The sawdust or other material flowing from the lowermost hopper is carried by a conveyer 16 to any desired point. There is preferably provided between the lowermost hopper 3 and the conveyer a wheel 17 provided with pockets into which the material is received from the hopper, and from which it is discharged into the conveyer as the wheel is revolved in any desired manner, as by means of the motor 18. All surfaces within the chamber are of course of acid-resisting material.

Located above the absorbing chamber 1 is a hopper or other suitable receptacle 8, into which the comminuted ligno cellulose is placed so that it can be conveniently fed into the absorbing chamber. Some means is provided for securing a substantially uniform feed. This may be done by providing at the bottom of the hopper a rotating wheel 9 having a series of pockets into which the sawdust drops from the hopper and is then carried around to the opening 10 of the absorbing chamber where it is dropped into such chamber. This wheel may be run in any desired manner, as by means of a motor 11. This motor, as shown, is a variable speed motor so that the feed of the sawdust can be regulated as desired by increasing or decreasing the speed of the wheel 9. Any other suitable means for varying the feed may be used.

The receptacle 8 may be provided with an opening 12, through which a poker may be inserted to keep the sawdust moving in the event the hopper becomes obstructed by it.

The acidulating gas or vapor may be introduced into the absorbing chamber near the bottom, as by means of pipe 13, and after passing through the chamber may pass out at the top thereof through the pipes 14. Means are provided for regulating or varying the amount of acidulating gas or vapor passed into the absorbing chamber. This may be done by means of a valve 15. When the construction herein shown is used there are preferably provided one or more doors 19 at the bottom of the absorbing chamber, so that access to the conveyer and associated parts may be had.

Instead of using sulfuric anhydrid, sulfuric acid itself may be sprayed into the absorbing chamber as shown in Fig. 4. In this construction air or steam is passed through the pipe 20. Sulfuric acid is fed into this pipe in any desired manner, as by means of an injector, and the material is formed into a spray by the nozzle 21 and passes through the absorbing chamber so as to be brought into contact with the comminuted ligno cellulose. It is of course evident that any other proper acidulating medium may be used. It is also evident that the acidulating gas may be introduced into the absorbing chamber at any point, and that any other suitable means than that herein shown may be used to secure the attenuated condition of the comminuted ligno cellulose.

The words "hydrolyzing gas" have been used in the specification and claim, and this term is intended to include gas, vapor, spray or the like.

The use and operation of the invention are as follows: In using the particular apparatus shown, the sawdust or other comminuted cellulose is placed in the receptacle 8 and the material fed therefrom through the opening 10 into the absorbing chamber 1. This material then engages the top spreading device 2 and is spread out into a thin sheet. It then passes through the spaces 6 into the hopper 3, the material passing from one spreading device to the next successively as it passes through the absorbing chamber. It will thus be seen that this material is spread out throughout its travel into thin sheets or streams. The acidulating gas or vapor is passed into the absorbing chamber through the pipe 13. It then passes up through the chamber as the comminuted cellulose is passing down. This acidulating gas or vapor passes through the comminuted material as it drops from one spreading device to the next and also passes along the surface of the comminuted material while it is on the spreading device. It will thus be seen that this acidulating gas or vapor comes into contact with all the particles of the comminuted material, and that a substantially uniform acidulation is secured. The sawdust or other comminuted ligno cellulose ordinarily used contains from thirty per cent. to fifty per cent. of water and when sulfuric anhydrid ($SO_3$) is used, it will combine directly with some of this water to form sulfuric acid. If desired, the interior of the absorbing chamber or the spreading device may be heated so as to prevent condensation of the sulfuric acid. This may be accomplished in any desired manner. By means of this process a sufficiently uniform mixture may be secured when the proportion of the acid to the comminuted cellulose is very small, such, for example, as one-half of one per cent. of acid to one hundred per cent. of comminuted material, and when sawdust is used this uniform acidulation may be secured without increasing the percentage of moisture over that found in the sawdust. By regulating the quantity of comminuted material and the quantity of gas or vapor entering the absorbing chamber, it will be seen that a proper relative flow of the two elements may be easily secured for the purpose of obtaining the result desired.

When the acidulated comminuted cellulose is used to produce fermentable sugar and alcohol, it is found that with the comparatively uniform mixture secured by the use of this apparatus there is better fermentation and the amount of fermentable sugar or alcohol secured from any given amount of comminuted cellulose may be materially higher than has heretofore been obtained.

I claim:

In apparatus for impregnating comminuted ligno-cellulose with a hydrolyzing gas, a closed chamber having interior acid-proof surfaces, sealed devices for introducing comminuted ligno-cellulose thereinto and withdrawing it therefrom, means for introducing a hydrolyzing gas into the chamber, and means within said chamber for spreading the comminuted ligno-cellulose in a thin stream or layer in contact with said gas.

GEORGE H. TOMLINSON.

Witnesses:
FRANCIS W. PARKER, Jr.,
SOPHIE B. WERNER.